C. T. EAID.
PACKING CASE.
APPLICATION FILED APR. 16, 1914.
1,205,872.
Patented Nov. 21, 1916.
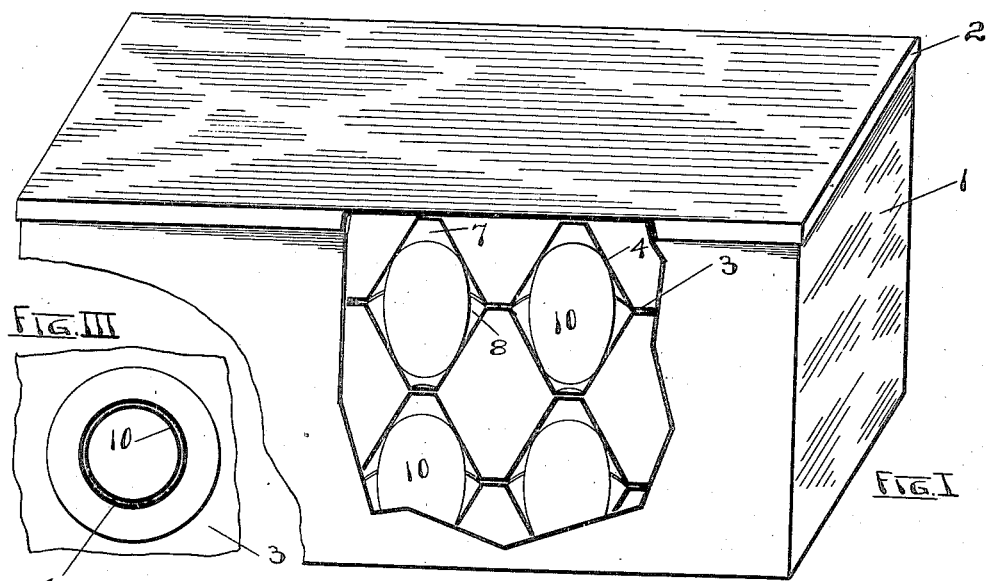
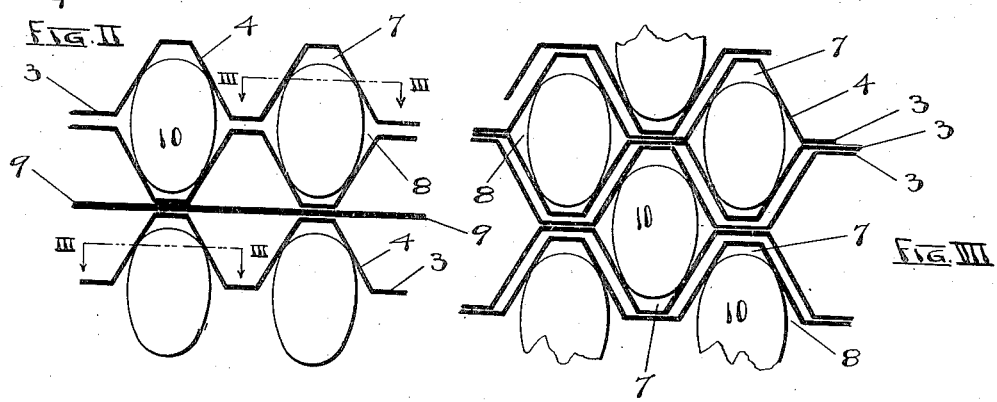
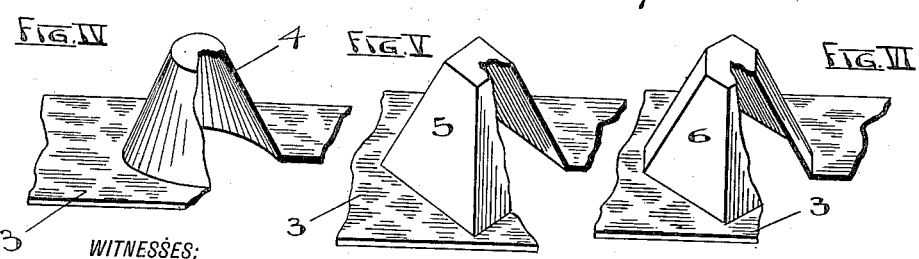

UNITED STATES PATENT OFFICE.

CLAYTON T. EAID, OF PORTLAND, OREGON.

PACKING-CASE.

1,205,872. Specification of Letters Patent. Patented Nov. 21, 1916.

Application filed April 16, 1914. Serial No. 832,226.

*To all whom it may concern:*

Be it known that I, CLAYTON T. EAID, a citizen of the United States of America, residing at Portland, in the county of Multnomah, in the State of Oregon, have invented certain new and useful Improvements in Packing-Cases, of which the following is a specification, reference being had to the accompanying drawing.

My invention relates to improvements in cases for the packing and transportation of articles such as eggs, fruit or the like, and has for its object the production of a case provided with means for supporting each egg or other article in such manner as to minimize its danger of breakage or injury.

My case comprises as one of its important features a spacing member or plate, which constitutes in itself a new and useful article of manufacture.

What constitutes my invention will be hereinafter specified in detail, and succinctly pointed out in the appended claims. To avoid circumlocution, I refer hereinafter to my device as adapted for use in packing eggs, but it should be understood that it is equally applicable for the general purpose of transportation.

In the accompanying drawing, Figure I is a perspective view of one form of embodiment of my invention, showing a crate or container having a portion of its front wall broken away, exhibiting the contents thereof, and showing one form of embodiment of my spacing member or plate as employed in practice. Fig. II is a view similar to the broken away portion of Fig. I, showing a slight modification of the method of assembling the spacing member or plate as illustrated in Fig. I. Fig. III is a section of the same on line III—III of Fig. II, and is intended to illustrate in a general way the principle of my invention in respect to the means provided in it for the support of an individual egg. Fig. IV is a perspective view, partially broken away, of the preferred form of the egg supporting member shown in the preceding figures. Fig. V is a view similar to Fig. IV, showing, as a modification of the supporting member shown in Fig. IV, a four-sided pyramid. Fig. VI is a similar view of a still further modification in a six sided pyramid. Fig. VII is a view similar to Fig. II, showing a form of embodiment of my invention involving a slightly modified construction and method of assemblage.

Referring to the numerals on the drawing, 1 indicates the body of a box, provided with a lid 2. The box 1 may be of any preferred shape, dimensions and material. It may be of a size adapted to contain but a few eggs, or to contain many. Irrespective of size, the box 1 is divided into individual egg compartments by a series of spacing members or plates, each of which is provided with one or more compartments. Each spacing member comprises, in effect, a sheet or board 3, which, being preferably made of wood pulp, is provided with one or more egg compartments 4, preferably formed integrally with it by being manufactured of the same material as that of which the sheet 3 is made.

I prefer to make each compartment in the shape of a truncated cone, as shown, for example, in the first four figures of the drawing. The conical compartment affords a distinct advantage in that, by reason of its complete circular contact with the sides of an egg or similarly shaped article, as well as by the presence of its closed end beyond the end of said article, it defines a terminal air cushion which coöperates with the resiliency of the said contact to protect the article within the compartment from breakage. The term "diamond shaped in longitudinal section," is intended herein to designate generally both the cone shaped and pyramid shaped compartment without exclusion of frusto-cone or frusto-pyramid shapes. The truncated effect is preferential only, a true cone being available if desired, and the term "conical", as used in the claims, is intended to designate a shape of compartment conformable either to a truncated or a true cone. Moreover, any shape of supporting member which will operate in accordance with the principle of my invention may be substituted for the cone shape. For example, the four-sided pyramid 5, shown in Fig. V, may be used in place thereof, or the six-sided pyramid 6 shown in Fig. VI.

The principle of my invention in respect to the office of the supporting member is that the supporting member shall make supporting contact in a peripheral line only. Such contact is illustrated in Figs. I and II, and the line of supporting contact in the form of embodiment of my invention shown in that principle is well illustrated in Fig. III. The inherent elasticity of the side walls of the supporting members is utilized as a yielding support for each egg. Moreover, the conical or equivalent shape of the supporting member provides a clear space, indicated by the numeral 7, at each end of the egg, and a circumferential clear space 8 upon the side of each egg. The presence of the spaces 7 and 8 locates the egg supporting contact for each egg, not only out of line with the sheets 3 which carry the egg supporting members, but out of line with the axes of the eggs. This feature, coupled with the resilient feature of the supporting member minimizes the chance of breakage of the eggs packed in a container such as the box 1. My supporting member is clearly distinguished by the ringlike supporting contact between it and the egg within it which differentiates it from any known form of egg supporting member, such for example, as the well known cup or box shape into which the eggs are introduced, so as to make contact at all points, or upon the sides and ends of the egg in particular.

In practice, the spacing member comprising the supporting members 4 that are assembled by aid of the sheets or boards 3, are placed one upon top of another, with the truncated ends of the cones in abutment, as shown in Fig. I, until the box 1, which is of proper dimensions, is filled. It is for this reason that the truncated form of egg supporter is preferred. If the reason for the preference is avoided the form may be varied accordingly.

I prefer to locate the sheets 3 of the adjacent spacing members or plates in close juxtaposition, as shown in Fig. I, but they may be slightly separated, as shown in Fig. II, and when so separated may be supported, if desired, upon intermediate sheets 9 between layers of eggs. The sheets 9 may be, if desired, independently supported by the side-walls of the box 1, and so afford an independent support for each layer of eggs; but this is a construction which would not be desirable ordinarily, although it might be used to advantage in transporting eggs a long distance, or in transporting eggs of a special value, as for hatching.

In Figs. I and II of the drawings, I have shown the compartments 4 as equally spaced one from another upon their respective sheets 3, and have shown non-contiguous compartments only as containing eggs 10. Such arrangement affords, on some accounts, the best form of embodiment of my invention, but if a greater economy of space be desired, it may be obtained by providing between compartments 4 a space sufficiently wide to accommodate within it the compartments of a spacing member without the necessity of contact between compartments. This construction and method of assemblage is shown in Fig. VII of the drawing.

In practice, a spacing member or plate is laid in the bottom of the box 1, with its supporting members below and resting upon the bottom of the box. The eggs are then introduced into the open ends of the supporting members until the capacity of the spacing member or plate is exhausted. A spacing member or plate is then placed upon top of the eggs, and confines each egg securely in place in the manner specified. This effect is accomplished whether the sheets 3 are face to face, as shown in Fig. I, or are slightly separated, as shown in Fig. II. The third spacing member or plate, if there be more than one layer of eggs, is introduced upon top of the second layer, and having been filled in the same manner, as the first layer, is surmounted by a fourth, and so on. The second and third spacing members or plates may come into direct contact with each other, as shown in Fig. I, or they may be separated by the plate 9, as shown in Fig. II. Again, if provision be made in the respective dispositions of the supporting members 4, as shown in Fig. VII, the method of assemblage illustrated therein may be employed, as has been specified, with economy of space without surrendering any of the advantages derivable from the use of my invention, particularly in respect to the non-contiguity of supporting members thereof.

Although my invention in its preferred form comprehends an egg supporting member embodying the principle of conical construction and having continuous walls as shown, for example, in Figs. IV, V and VI, yet the said principle of construction is broad enough to include a ring support reduced to its lowest terms, in which the ring and its operative connection with means for supporting it against an egg, as, for example, a sheet or board 3, or a plate 9, as required, or their respective equivalents, are the essential elements. In other words, I contemplate the practicability of employing a cone, even if it be skeletonized to include no more than such a ring and its means of support referred to in the last sentence, but since such construction is but a part of that whole which has been specified, it does not appear to require more than this allusion to indicate it. This form of device last referred to would in practice require the boards 3 or sheets 9, as the case might be, to be supported by the side walls of the box 1 to keep the layer of eggs separated from each other, as well as from the top and bottom of the box, a necessity which is obviated by the presence of the ends of the supporting members when employing the complete conical construction. It is for this reason, in part, that the complete conical construction is the preferred construction.

Consideration of the structure illustrated in Fig. I will disclose that in the representative assemblage of elements therein shown the lowermost spacing member 3 is securely supported by its supporting members 4 upon the bottom of the container 1, and that the spacing member next above is supported upon the first. The supporting members of the third spacing members rest upon those of the second, and so on until the topmost spacing member is reached, whose supporting members engage the inner face of the wall of the container that is opposite the one first named. In other words, the assemblage of members within the container are, when the lid 2 is closed, snugly confined between the walls of the container represented by its bottom and its lid, while the supporting members 4 constitute, in continuous succession, a supporting wall between opposite walls of the container to positively resist their collapse, and to protect the contents of the individual compartments which they define throughout the interior of the container. The spacing members 3 operate either with or without reinforcement of plates 9, to support the walls of the container which they engage.

What I claim is:

1. In a packing case, a pair of plates each provided with coöperating supporting members adapted to inclose and confine an article between them by line contacts lying wholly in planes on opposite sides of and substantially parallel to said plates, said supporting members each having a length greater than one-half the length of the article to be supported therein, whereby spaces are left at opposite ends of the supported article.

2. In a packing case, the combination with a plate of resilient material having a resilient supporting member projecting from one side thereof, a second plate provided with a coöperating supporting member, the combined length of said supporting members being greater than the length of the article to be supported thereby, said supporting members each having converging straight side walls whereby a spheroidal article inserted therein will have a peripheral line contact only with said walls.

3. In a container, a pair of sheets each provided with egg supporting members having straight tapering walls, the length of which walls in each sheet is greater than one-half the length of the article to be supported, said members adapted to support an egg by substantially circular contact therewith adjacent each end at points lying in a common plane.

4. In a device of the character described, a plurality of sheets each having supporting members projecting from one side only thereof, said supporting members each having a length greater than half the length of the article to be supported thereby, and having their sides lying in planes tangent to the sides of the article to be supported.

5. In a packing case, a plurality of plates provided with egg supporting members, said plates being adapted to be positioned with the supporting members of one in coöperative position with the supporting members of the other, said supporting members being substantially cone-shaped and having the walls thereof contacting with and tangent to a peripheral line of the egg adjacent each end thereof, the length of each of said supporting members being greater than one-half the length of the egg whereby a space is left adjacent each end of said egg.

In testimony whereof, I have hereunto set my hand in the presence of two subscribing witnesses.

CLAYTON T. EAID.

Witnesses:
JOSEPH L. ATKINS,
HOWARD O. ROGERS.